(12) United States Patent
Briff et al.

(10) Patent No.: US 12,231,060 B2
(45) Date of Patent: Feb. 18, 2025

(54) VOLTAGE SOURCE CONVERTERS FOR POWER CONVERSION IN A HVDC POWER TRANSMISSION NETWORK

(71) Applicant: General Electric Technology GmbH, Baden (CH)

(72) Inventors: Pablo Briff, Stafford (GB); Andrzej Adamczyk, Stafford (GB); Sameer Singhal, Stafford (GB)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 222 days.

(21) Appl. No.: 17/998,793

(22) PCT Filed: May 28, 2021

(86) PCT No.: PCT/EP2021/064396
§ 371 (c)(1),
(2) Date: Nov. 14, 2022

(87) PCT Pub. No.: WO2021/244979
PCT Pub. Date: Dec. 9, 2021

(65) Prior Publication Data
US 2023/0344364 A1    Oct. 26, 2023

(30) Foreign Application Priority Data
Jun. 1, 2020 (EP) .................................... 20275099

(51) Int. Cl.
*H02M 7/483* (2007.01)
*H02M 1/00* (2006.01)
(52) U.S. Cl.
CPC ....... *H02M 7/4835* (2021.05); *H02M 1/0012* (2021.05); *H02M 1/0025* (2021.05)

(58) Field of Classification Search
CPC .. H02M 3/1582; H02M 3/1584; H02M 3/285; H02M 3/33561; H02M 7/49;
(Continued)

(56) References Cited

U.S. PATENT DOCUMENTS

| | | | | |
|---|---|---|---|---|
| 7,835,166 | B2 * | 11/2010 | Hiller .................... | H02M 7/483 363/132 |
| 8,861,231 | B2 * | 10/2014 | Cross ..................... | H02M 7/49 363/35 |

(Continued)

OTHER PUBLICATIONS

International Search Report and Written Opinion in PCT/EP2021/064396 dated Jun. 1, 2020 (11 pages).
(Continued)

*Primary Examiner* — Sean Kayes
*Assistant Examiner* — Nusrat Quddus
(74) *Attorney, Agent, or Firm* — Eversheds Sutherland (US) LLP (57) ABSTRACT

A voltage source converter includes first and second DC terminals which have at least one converter limb extending therebetween. Each limb portion includes a chain-link converter that extends between an associated AC terminal and a corresponding one of the first or the second DC terminal. Each chain-link converter also includes a chain-link converter controller which is programmed to control a series of connected chain-link modules. The voltage source converter additionally includes a voltage source converter controller which is arranged in operative communication with each chain-link converter controller to coordinate operation of the chain-link converters. Each chain-link converter controller is further programmed to reconstruct from a received modulation index demand the chain-link converter voltage reference, which the chain-link converter it is controlling is required to produce, by multiplying the received modulation
(Continued)

index demand by a total voltage sum established at a first time instant.

11 Claims, 2 Drawing Sheets

(58) Field of Classification Search
CPC ........ H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 3/073; H02M 3/10; H02M 3/135; H02M 3/137; H02M 3/28; H02M 3/315; H02M 3/3155; H02M 3/325; H02M 3/335; H02M 7/515; H02M 7/521; H02M 7/53; H02M 7/537; H02M 7/5383; H02M 7/53862; H02M 7/757; H02M 7/79; H02M 3/337; H02M 3/338; H02M 3/3382; H02M 3/3384; H02M 7/538; H02M 7/53832; H02M 7/53835; H02M 7/487; H02M 7/539; H02M 7/23; H02M 7/21; H02M 7/12; H02M 7/04; H02M 7/00; H02M 7/4835; H02J 3/46; H02J 3/38

See application file for complete search history.

(56) References Cited

U.S. PATENT DOCUMENTS

| | | | | |
|---|---|---|---|---|
| 9,209,693 | B2* | 12/2015 | Davidson | H02M 7/4835 |
| 9,954,358 | B2* | 4/2018 | Okaeme | H02M 7/4835 |
| 10,312,824 | B2* | 6/2019 | Shinoda | H02M 7/538466 |
| 10,460,057 | B2* | 10/2019 | Li | G06F 30/367 |
| 11,515,807 | B1* | 11/2022 | Liu | H02M 7/4835 |
| 2010/0067266 | A1 | 3/2010 | Dommaschk et al. | |
| 2012/0063181 | A1* | 3/2012 | Chimento | H02J 3/1857 363/56.03 |
| 2017/0170658 | A1* | 6/2017 | Tengner | H02M 7/4835 |
| 2018/0034382 | A1* | 2/2018 | Chivite Zabalza | H02M 1/08 |
| 2018/0069469 | A1* | 3/2018 | Gupta | H02M 7/483 |
| 2018/0131291 | A1* | 5/2018 | Lavieville | H02M 7/483 |
| 2019/0305691 | A1* | 10/2019 | Shukla | H02M 7/483 |
| 2020/0395757 | A1* | 12/2020 | Mukhedkar | H02J 3/36 |
| 2023/0026670 | A1* | 1/2023 | Liu | H02M 7/4837 |

OTHER PUBLICATIONS

Abel et al.: Comparison of cell selection methods for modular multilevel converters. 2016 IEEE 16th International Conference on Environment and Electrical Engineering (EEEIC), IEEE, (2021): 1-8.

* cited by examiner

VOLTAGE SOURCE CONVERTERS FOR POWER CONVERSION IN A HVDC POWER TRANSMISSION NETWORK

CROSS-REFERENCE TO RELATED APPLICATIONS

This application is a U.S. National Stage Application under 35 U.S.C. § 371 and claims the priority to International Application No. PCT/EP2021/064396, filed May 28, 2021, which claims priority to European Application No. 20275099.8, filed Jun. 1, 2020, both of which are incorporated herein by reference.

TECHNICAL FIELD

This invention relates to a voltage source converter, for power conversion between alternating current (AC) and direct current (DC) in a high voltage direct current (HVDC) power transmission network, and to a method of operating such a voltage source converter.

BACKGROUND OF THE INVENTION

In HVDC power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance. DC power can also be transmitted directly from offshore wind parks to onshore AC power transmission networks.

The conversion between DC power and AC power is utilised where it is necessary to interconnect DC and AC networks. In any such power transmission network, converters (i.e. power converters) are required at each interface between AC and DC power to effect the required conversion from AC to DC or from DC to AC.

One type of power converter is a voltage source converter, although other types of power converter are also possible.

SUMMARY OF THE INVENTION

According to a first aspect of the invention there is provided a voltage source converter, for power conversion between AC and DC in a HVDC power transmission network, comprising:
  first and second DC terminals for connection to a DC network and having at least one converter limb extending therebetween, the or each converter limb including first and second limb portions separated by a corresponding AC terminal for connection to a respective phase of an AC network, each limb portion including a chain-link converter extending between the associated AC terminal and a corresponding one of the first or the second DC terminal, and each chain-link converter including a chain-link converter controller programmed to control a plurality of series connected chain-link modules each having a plurality of switching elements connected in parallel with an energy storage device, whereby each chain-link converter is controllable to provide a stepped variable voltage source; and
  a voltage source converter controller arranged in operative communication with each chain-link converter controller to coordinate operation of the chain-link converters,
  at least one chain-link converter controller being programmed to establish at a first time instant a total voltage sum of all energies stored by the energy storage devices in each chain-link converter within the voltage source converter, and to send the established total voltage sum to the voltage source converter controller,
  the voltage source converter controller being programmed to establish a modulation index demand for each chain-link converter, each said modulation index demand corresponding to a chain-link converter voltage reference that the corresponding chain-link converter is required to produce divided by the received total voltage sum, and further being programmed to send the established modulation index demand to each corresponding chain-link converter controller, and
  each chain-link converter controller being further programmed to reconstruct from the received modulation index demand the chain-link converter voltage reference the chain-link converter it is controlling is required to produce by multiplying the received modulation index demand by the total voltage sum established at the first time instant.

Having a voltage source converter controller that is establishes a modulation index demand for each chain-link converter is desirable since the provision of such a modulation index signal is a mandatory requirement in many newly commissioned power transmission networks.

Accordingly, utilising such a modulation index demand as a way of communicating the chain-link converter voltage reference that a given chain-link converter is required to produce usefully makes use of a signal that must be provided in any event.

Moreover, including chain-link converter controllers that reconstruct the aforesaid chain-link converter voltage reference by multiplying the received modulation index demand by the total voltage sum established at the first time instant, rather than the current total voltage sum at a later time instant when each chain-link converter controller actually receives the said modulation index demand, compensates for the time delays occasioned by (i) the total voltage sum established at the first time instant being sent to the converter controller, and (ii) the established modulation index being sent from the voltage source converter controller to each chain-link converter controller, and thereby avoids the introduction of amplitude modulation to the reconstructed chain-link converter voltage references, which would otherwise arise, e.g. if each chain-link converter controller instead multiplied the received modulation index demand by the total voltage sum established at the current time instant when it receives the said modulation index demand.

In that regard, the introduction of amplitude modulation to the reconstructed chain-link converter voltage references is highly undesirable because it has an adverse effect on the voltage produced by each chain-link converter, and it creates harmonic components that lead to resonances, instabilities, and/or a degradation of the modulation index demand signal quality.

In addition, being able to reconstruct each chain-link converter voltage reference in the aforesaid accurate manner, at a chain-link converter controller level rather than a the higher voltage source converter controller level, allows the voltage source converter to operate on the basis of the, often mandatory, modulation index demands, without the need for a major redesign of the hardware and software of the chain-link converters and associated chain-link converter controllers, or other extensive engineering redesign and validation work.

In a preferred embodiment of the invention the voltage source converter controller is further programmed to synchronise the established modulation index demand with the received total voltage sum.

Such a feature desirably permits the voltage source converter of the invention to utilise a plurality of total voltage sums established at subsequent time instants, along with a corresponding plurality of modulation index demands, to maintain accurate control of the power transfer functionality of the voltage source converter over a sustained period of time.

Preferably the total voltage sum of all energies stored by the energy storage devices in each chain-link converter within the voltage source converter, at time instant k is given by $$v^\Sigma(k)$$

Optionally the modulation index demand established by the voltage source converter controller for each chain-link converter is given by $$\rho(k) = \frac{v^*(k)}{v^\Sigma(k - n/2)}$$

where,
v*(k) is the chain-link converter voltage reference that the corresponding chain-link converter is required to produce;
$v^\Sigma(k-n/2)$ is the total voltage sum received from the at least one chain-link converter controller, with n being representative of a symmetrical round trip delay between each chain-link converter controller and the voltage source converter controller.

The foregoing features advantageously allow the total voltage sum to be captured and subsequently utilised by the voltage source converter controller to establish the required modulation index demand for each chain-link converter, based on the chain-link converter voltage reference similarly determined by the voltage source converter voltage for each chain-link converter, while at the same time accounting for the time delay resulting from the total voltage sum having to be physically sent from the at least one chain-link converter controller to the voltage source converter controller, and thereby helps to synchronise the modulation index demand with the corresponding total voltage sum received from the at least one chain-link converter controller.

The modulation index demand received by each corresponding chain-link converter controller, may be considered to be given by $$\rho(k) = \frac{v^*(k)}{v^\Sigma(k - n)}$$

Having the modulation index demand received by each chain-link converter controller be considered from the perspective of each such chain-link converter controller in the foregoing manner, beneficially accounts for a further time delay, represented by n/2, occasioned by the need to send each modulation index demand to the corresponding chain-link converter controller, and thereby desirably completes the synchronisation of the modulation index demand with the corresponding total voltage sum received from the at least one chain-link converter controller.

In a preferred embodiment of the invention the chain-link converter voltage reference each chain-link converter controller reconstructs is given by $$v(k) = \left(\frac{v^*(k)}{v^\Sigma(k-n)}\right)v^\Sigma(k-n) = v^*(k)$$

where,
$v^\Sigma(k-n)$ is the total voltage sum established at the first time instant.

Reconstructing each converter voltage reference in the foregoing manner advantageously ensures that the modulation index demand is synchronised with the corresponding established total voltage sum, such that each of a plurality of modulation index demands established at subsequent time instants is multiplied by the total voltage sum established at the corresponding time instant to accurately compensate over a sustained period of time for the transmission delays from the at least one chain-link converter controller to the voltage source converter controller, and back from the voltage source converter controller to each chain-link converter controller.

Preferably n representative of the symmetrical round trip delay is established by time-stamping the total voltage sum established at the first time instant.

Time stamping the total voltage sum is helpful in establishing the extent of the round trip delay because, e.g. it allows the voltage source converter controller to work out from the time instant it receives the total voltage sum how long the delay is.

In another preferred embodiment of the invention n representative of the symmetrical round trip delay is recalculated each time a total voltage sum is established at a subsequent time instant.

Such a feature helps to ensure that the delay continues to be represented in an accurate manner.

Optionally the at least one chain-link converter controller is further programmed to apply a sequence identifier to the established total voltage sum prior to sending the established total voltage sum to the voltage source converter controller, and the voltage source converter controller synchronises the established modulation index demand with the received total voltage sum by applying a corresponding sequence identifier to the established modulation index demand prior to sending the established modulation index demand to each corresponding chain-link converter controller.

The foregoing feature helps to ensure that the established modulation index demand can be easily paired with the total voltage sum upon which it is based, e.g. during subsequent reconstruction of a chain-link converter voltage reference by a given chain-link converter controller.

Each chain-link converter controller may be further programmed to reconstruct the chain-link converter voltage reference the chain-link converter it is controlling is required to produce by multiplying the received modulation index demand by the total voltage sum having the corresponding sequence identifier.

Such a feature makes use of the aforementioned easy pairing to ensure that the modulation index demand and the total voltage sum being manipulated by each chain-link converter controller are synchronised with one another so that the reconstructed chain-link converter voltage reference is accurate, and use can be made of a plurality of established modulation index demands and corresponding total voltage sums to control the voltage source converter over a sustained period of time.

According to a second aspect of the invention there is provided a method of operating a voltage source converter to convert power between AC and DC in a HVDC power transmission network, the voltage source converter comprising:
first and second DC terminals for connection to a DC network and having at least one converter limb extending therebetween, the or each converter limb including first and second limb portions separated by a corresponding AC terminal for connection to a respective phase of an AC network, each limb portion including a chain-link converter extending between the associated AC terminal and a corresponding one of the first or the second DC terminal, and each chain-link converter including a chain-link converter controller programmed to control a plurality of series connected chain-link modules each having a plurality of switching elements connected in parallel with an energy storage device, whereby each chain-link converter is controllable to provide a stepped variable voltage source; and
a voltage source converter controller arranged in operative communication with each chain-link converter controller to coordinate operation of the chain-link converters,
the method comprising the steps of:
(a) having at least one chain-link converter controller establish at a first time instant a total voltage sum of all energies stored by the energy storage devices in each chain-link converter within the voltage source converter, and having the at least one chain-link converter controller send the established total voltage sum to the voltage source converter controller;
(b) having the voltage source converter controller establish a modulation index demand for each chain-link converter, each said modulation index demand corresponding to a chain-link converter voltage reference that the corresponding chain-link converter is required to produce divided by the received total voltage sum, and further having the voltage source converter controller send the established modulation index demand to each corresponding chain-link converter controller; and
(c) having each chain-link converter controller reconstruct from the received modulation index demand the chain-link converter voltage reference the chain-link converter it is controlling is required to produce by multiplying the received modulation index demand by the total voltage sum established at the first time instant.

The method of the invention shares the benefits of the corresponding features of the voltage source converter of the invention.

It will be appreciated that the use of the terms "first" and "second", and the like, in this patent specification is merely intended to help distinguish between similar features (e.g. the first and second DC terminals), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

There now follows a brief description of preferred embodiments of the invention, by way of non-limiting example, with reference being made to the following figures in which.

DETAILED DESCRIPTION

Figure 1:
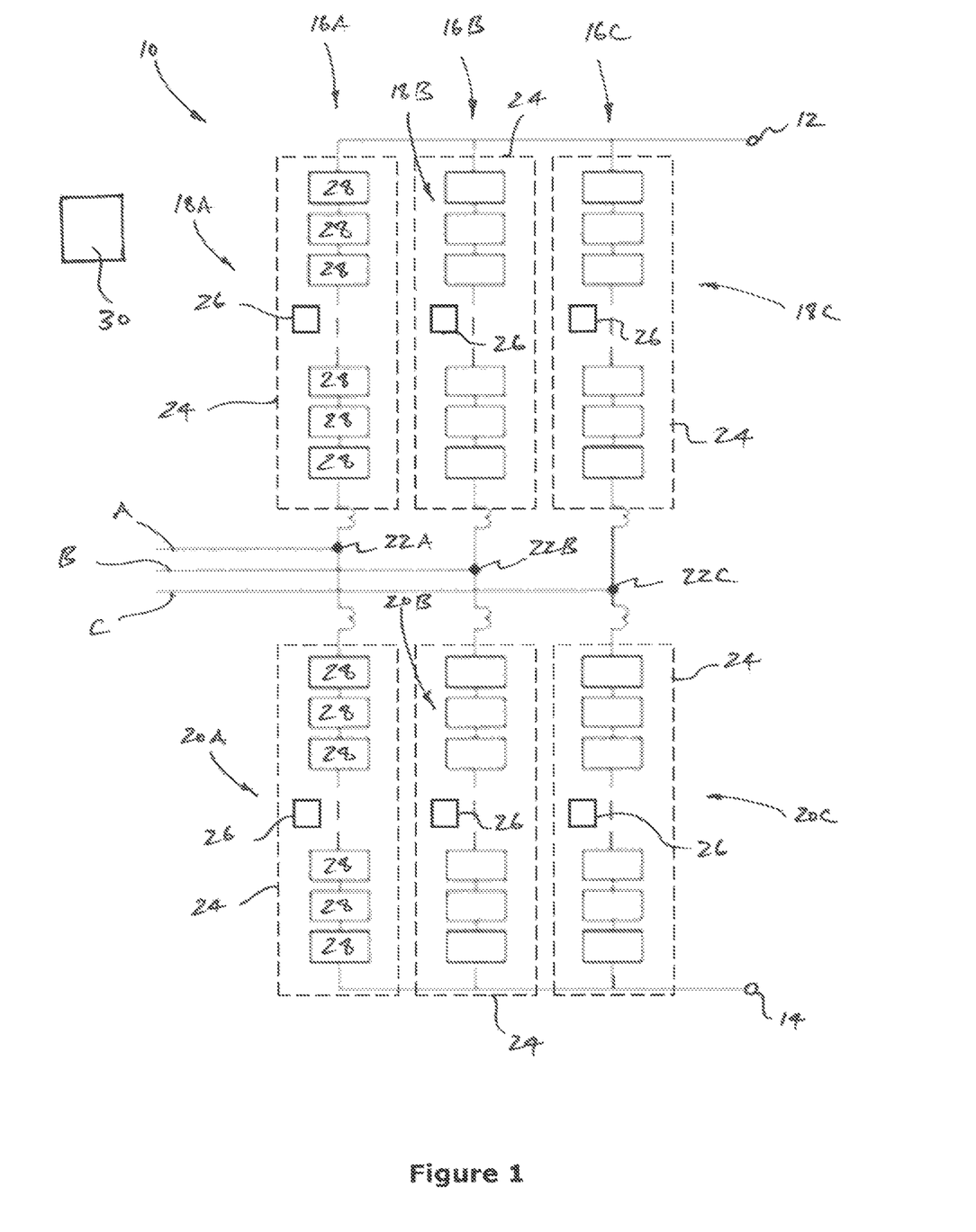
FIG. 1 shows a schematic view of a voltage source converter according to a first embodiment of the invention.

A voltage source converter according to a first embodiment of the invention is designated generally by reference numeral 10.

The voltage source converter 10 includes first and second DC terminals 12, 14, between which extends three converter limbs 16A, 16B, 16C, each of which corresponds to a given phase A, B, C of a three-phase AC network with which the converter 10 is, in use, connected.

Each converter limb 16A, 16B, 16C includes first and second limb portions 18A, 18B, 18C, 20A, 20B, 20C which are separated by a corresponding AC terminal 22A, 22B, 22C.

In use the first and second DC terminals 12, 14 are connected to a DC network, and each AC terminal 22A, 22B, 22C is connected to a respective phase A, B, C of the AC network.

Other embodiments of the invention may include fewer than or greater than three converter limbs, depending on the configuration of an associated AC network with which the voltage source converter of the invention is intended to be connected.

Meanwhile, returning to the embodiment shown, each limb portion 18A, 18B, 18C, 20A, 20B, 20C includes a chain-link converter 24 which extends between the associated AC terminal 22A, 22B, 22C and a corresponding one of the first or the second DC terminal 12, 14.

Each chain-link converter 24 includes a chain-link converter controller 26 which is programmed to controller a plurality of series connected chain-link modules 28.

Each chain-link module 28 includes a number of switching elements (not shown) which are connected in parallel with an energy storage device in the form of a capacitor, although other types of energy storage device, i.e. any device that is capable of storing and releasing energy to selectively provide a voltage, e.g. a fuel cell or battery, may also be used.

Each switching element includes a semiconductor device, typically in the form of an Insulated Gate Bipolar Transistor (IGBT).

It is, however, possible to use other types of self-commutated semiconductor devices, such as a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated switching device. In addition, one or more of the semiconductor devices may instead include a wide-bandgap material such as, but not limited to, silicon carbide, boron nitride, gallium nitride and aluminium nitride.

The number of semiconductor devices in each switching element may vary depending on the required voltage and current ratings of that switching element.

Each of the switching elements also includes a passive current check element that is connected in anti-parallel with a corresponding semiconductor device. The or each passive current check element may include at least one passive current check device. The or each passive current check device may be any device that is capable of limiting current flow in only one direction, e.g. a diode. The number of passive current check devices in each passive current check element may vary depending on the required voltage and current ratings of that passive current check element.

A first exemplary chain-link module may include a first pair of switching elements that are connected in parallel with a capacitor in a known half-bridge arrangement to define a 2-quadrant unipolar module. Switching of the switching elements selectively directs current through the capacitor or causes current to bypass the capacitor, such that the first exemplary chain-link module can provide zero or positive voltage and can conduct current in two directions.

A second exemplary chain-link module may include first and second pairs of switching elements and a capacitor are connected in a known full bridge arrangement to define a 4-quadrant bipolar module. In a similar manner to the first exemplary chain-link module, switching of the switching elements again selectively directs current through the capacitor or causes current to bypass the capacitor such that the second exemplary chain-link module can provide zero, positive or negative voltage and can conduct current in two directions.

Each chain-link converter 24 may include solely first exemplary chain-link modules, solely second exemplary chain-link modules, or a combination of first and second exemplary chain-link modules.

In any event, the provision of a plurality of chain-link modules 28 means that it is possible to build up a combined voltage across each chain-link converter 24, via the insertion of the energy storage devices, i.e. the capacitors, of multiple chain-link modules 28 (with each chain-link module 28 providing its own voltage), which is higher than the voltage available from each individual chain-link module 28.

Accordingly, the chain-link modules 28 work together to permit the chain-link converter 24 to provide a stepped variable voltage source. This permits the generation of a voltage waveform across each chain-link converter 24 using a step-wise approximation. As such each chain-link converter is capable of providing a wide range of complex waveforms.

In addition, the voltage source converter 10 includes a voltage source converter controller 30 which is arranged in operative communication, e.g. via a known communications interface 32, with each chain-link converter controller 26 to coordinate operation of the chain-link converters 24.

For example, coordinated operation of each chain-link converter 24 in the aforementioned manner to provide a stepped variable voltage source can be used to generate an AC voltage waveform at each AC terminal 22A, 22B, 22C, and thereby enable the voltage source converter 10 to provide power transfer functionality between the AC and DC networks.

Each chain-link converter controller 26 is additionally programmed to establish an individual voltage sum of energies stored by each energy storage device in the respective chain-link converter 24 that it is arranged to control. Such an individual voltage sum may be established by measuring individual energy storage device, i.e. capacitor, voltages, or by estimation or prediction of such individual voltages. In any event, these individual voltages sums are communicated to a single chain-link converter controller 26 which establishes, at a first time instant k, a total voltage sum of all energies stored by the energy storage devices in each chain-link converter 24 within the voltage source converter 10. The delay between acquisition and/or computation of the individual voltage sums from the associated chain-link modules 28 and establishment of a total voltage sum is assumed to be negligible.

In other embodiments of the invention, the arrangements for establishing such a total voltage sum at a first time instant k, may differ, e.g. the total voltage sum may itself be estimated or predicted, but in any event at least one chain-link converter controller 26 is further programmed to send the established total voltage sum of all energies within the voltage source converter 10 to the voltage source converter controller 30.

Figure 2:
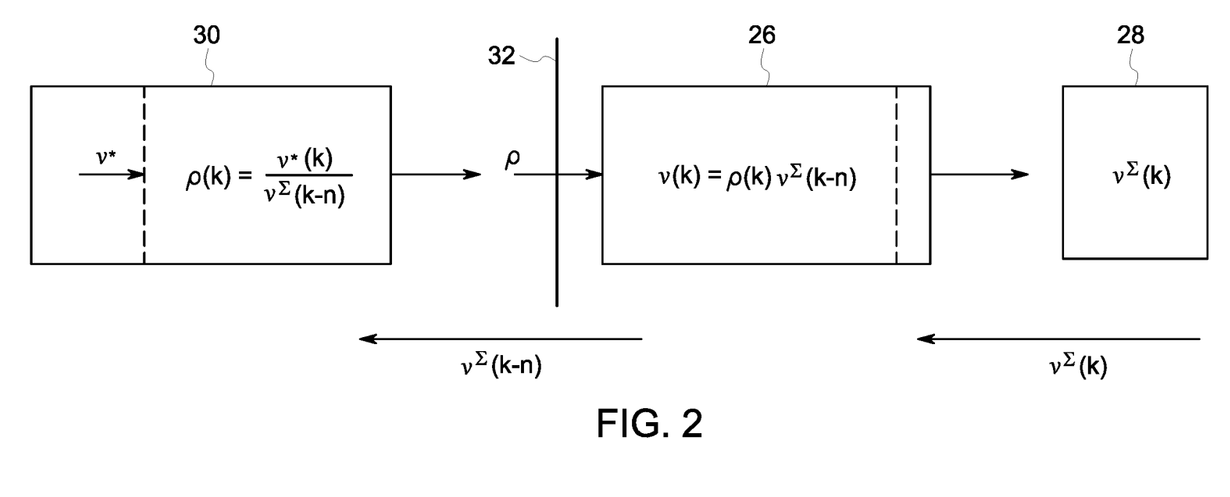
FIG. 2 schematically illustrates operation of the voltage source converter shown in FIG. 1.

Such a total voltage sum $v^\Sigma$, at first time instant k, is given by $$v^\Sigma(k)$$

as shown schematically in FIG. 2.

Thereafter, the voltage source converter controller 30 is programmed to establish a modulation index demand ρ for each chain-link converter 24.

Each said modulation index demand ρ corresponds to a chain-link converter voltage reference v*(k) that is determined by the voltage source converter controller 30 according to the operating requirements of the voltage source converter 10, and which the corresponding chain-link converter 24 is required to produce at the first time instant k, divided by the received total voltage sum $v^\Sigma(k)$.

However, there is a transmission delay between the aforesaid chain-link converter controller 26 sending the total voltage sum $v^\Sigma(k)$ at first time instant k, and the voltage source converter controller 30 actually receiving the corresponding communication signal.

A symmetrical, round trip delay between the voltage source converter controller 30 and each chain-link converter controller 26 can be represented by a number of samples n of the voltage source converter controller 30 sampling time, noting that n may be a non-integer number.

One way in which the symmetrical round trip delay can be established, and the corresponding number of samples n representative of the delay be determined, is by time-stamping the total voltage sum $v^\Sigma(k)$ established at the first time instant k.

Moreover, preferably the symmetrical round trip delay, and corresponding sample number n, is recalculated each time a total voltage sum is established at a subsequent time instant.

It follows that by the time the voltage source converter controller 30 receives the total voltage sum it will have an equivalent value of $v^\Sigma(k-n/2)$, i.e. the total voltage sum $v^\Sigma(k)$ at the first time instant k, delayed by half of the round trip delay n.

Accordingly, the modulation index demand ρ(k) at first time instant k for each chain-link converter 24, which is established by the voltage source converter controller 30, takes the form $$\rho(k) = \frac{v^*(k)}{v^\Sigma(k-n/2)}$$

as shown schematically in FIG. 2.

After establishing the respective modulation index demand ρ(k) for each chain-link converter 24, the voltage source converter controller 30 is further programmed to send the established modulation index demand ρ(k) to each corresponding chain-link converter controller 26, again as shown schematically in FIG. 2.

Each chain-link converter controller 26 is further programmed to reconstruct from the received modulation index demand ρ(k) the chain-link converter voltage reference v(k) the chain-link converter 24 it is controlling is required to produce.

In this regard, because of the further delay caused by the transmission of each modulation index demand ρ(k) from the voltage source converter controller 30 to each chain-link converter controller 26, i.e. a half symmetrical round trip delay of n/2 samples, the modulation index demand ρ(k) received by each chain-link converter controller 26 is considered to be given by $$\rho(k) = \frac{v^*(k)}{v^\Sigma(k-n)}$$

where, $v^\Sigma(k-n)$ is the total voltage sum established at the first time instant, with the extra delay of n/2 samples added to it.

Each chain-link converter controller 26 reconstructs its corresponding chain-link converter voltage reference v(k) from the received modulation index demand ρ(k) by multiplying the received modulation index demand ρ(k) by the total voltage sum established at the first time instant.

Again, as indicated above, the total voltage sum established at the first time instant k is, following the round trip delay of n samples, now equivalent to $v^\Sigma(k-n)$.

Accordingly, the corresponding chain-link converter voltage reference v(k) reconstructed by each chain-link converter controller 26 is given by $$v(k) = \left(\frac{v^*(k)}{v^\Sigma(k-n)}\right) v^\Sigma(k-n) = v^*(k)$$

In other words, each chain-link converter controller 26 correctly compensates for the round trip delay and reconstructs its chain-link converter voltage reference v(k) accurately as v*(k), i.e. the chain-link converter voltage reference v*(k) originally determined by the voltage source converter controller 30.

Moreover, compensating for the round trip delay in the foregoing manner additionally synchronises the established modulation index demand ρ(k) with the total voltage sum established at the first instant, i.e. $v^\Sigma(k-n)$. This means that a plurality of modulation index demands, each established at a subsequent time instant, can nevertheless be multiplied by the total voltage sum established at the corresponding time instant in order to compensate for the transmission delays between chain-link converter controllers 26 and the voltage source converter controller 30, and thereby ensure accurate control of the voltage source converter 10 over a sustained period of time.

In an additional embodiment of the invention (not shown), the voltage source converter controller may be further programmed to synchronise the established modulation index demand with the received total voltage sum in a different manner.

For example, the at least one chain-link converter controller which sends the established total voltage sum of all energies within the voltage source converter to the voltage source converter controller may be further programmed to apply a sequence identifier to the total voltage sum established, prior to sending the established total voltage sum to the voltage source converter controller. Such a sequence identifier might be added to a data frame for the total voltage sum, and could take the form $v_{(abc123)}$, $v_{(abc124)}$, etc, for successive total voltage sums.

The voltage source converter controller may then synchronise the established modulation index demand with the received total voltage sum by applying a corresponding sequence identifier to the established modulation index demand, e.g. in the form of an identical sequence identifier $\rho_{(abc123)}$, $\rho_{(abc124)}$, etc, for successive modulation index demands, prior to sending the established modulation index demand to each corresponding chain-link converter controller.

Thereafter, in the additional embodiment, each chain-link converter controller may be further programmed to reconstruct the chain-link converter voltage reference the chain-link converter it is controlling is required to produce by multiplying the received modulation index demand by the total voltage sum which has the corresponding sequence identifier, e.g. the same sequence identifier $_{(abc123)}$ or $_{(abc124)}$. Other corresponding sequence identifiers may be used instead, providing each is related to the original sequence identifier applied to the total voltage sum established, such that the correct corresponding received modulation index demand can be identified.

It follows that in the additional embodiment, a plurality of modulation index demands (each established at a subsequent time instant) can similarly be multiplied by the total voltage sum established at the corresponding time instant, i.e. the total voltage sum having the same sequence identifier, in order again to compensate for the transmission delays between chain-link converter controllers and the voltage source converter controller, while making use of a plurality of modulation index demands established at subsequent time instants to ensure accurate control of the voltage source converter over a sustained period of time.

In contrast to the embodiments of the invention described above, if one or more of the chain-link converter controllers 26 was to reconstruct its corresponding chain-link converter voltage reference v(k) from the received modulation index demand ρ(k) by multiplying the received modulation index demand ρ(k) by the total voltage sum currently established at a later time instant when it receives the modulation index demand ρ(k), the said reconstructed chain-link converter voltage reference v(k) would instead be given by $$v(k) = \left(\frac{v^*(k)}{v^\Sigma(k-n)}\right) v^\Sigma(k) = \frac{v^\Sigma(k)}{v^\Sigma(k-n)} v^*(k)$$

As such, an amplitude modulation, i.e.

$$\frac{v^\Sigma(k)}{v^\Sigma(k-n)}$$

has been added to the reconstructed chain-link converter voltage reference v(k) with respect to the chain-link converter voltage reference v*(k) originally determined by the voltage source converter controller 30.

This is highly undesirable because it has an adverse effect on the voltage produced by each chain-link converter 24, and it creates harmonic components that lead to resonances, instabilities, and/or a degradation of the modulation index demand ρ(k) signal quality.

We claim:

1. A voltage source converter, for power conversion between AC and DC in a HVDC power transmission network, comprising:
    first and second DC terminals for connection to a DC network and having at least one converter limb extending therebetween, the or each converter limb including first and second limb portions separated by a corresponding AC terminal for connection to a respective phase of an AC network, each limb portion including a chain-link converter extending between the associated AC terminal and a corresponding one of the first or the second DC terminal, and each chain-link converter including a chain-link converter controller programmed to control a plurality of series connected chain-link modules each having a plurality of switching elements connected in parallel with an energy storage device, whereby each chain-link converter is controllable to provide a stepped variable voltage source; and
    a voltage source converter controller arranged in operative communication with each chain-link converter controller to coordinate operation of the chain-link converters;
    at least one chain-link converter controller being programmed to establish at a first time instant a total voltage sum of all energies stored by the energy storage devices in each chain-link converter within the voltage source converter, and to send the established total voltage sum to the voltage source converter controller;
    the voltage source converter controller being programmed to establish a modulation index demand for each chain-link converter, each modulation index demand corresponding to a chain-link converter voltage reference that the corresponding chain-link converter is required to produce divided by the received total voltage sum, and further being programmed to send the established modulation index demand to each corresponding chain-link converter controller; and
    each chain-link converter controller being further programmed to reconstruct, from the received modulation index demand, the chain-link converter voltage reference that the chain-link converter it is controlling and is required to produce; wherein the chain-link converter voltage reference is reconstructed by multiplying the received modulation index demand by the total voltage sum established at the first time instant.

2. A voltage source converter according to claim 1, wherein the voltage source converter controller is further programmed to synchronize the established modulation index demand with the received total voltage sum.

3. A voltage source converter according to claim 2, wherein the total voltage sum of all energies stored by the energy storage devices in each chain-link converter within the voltage source converter, at time instant k is given by $$v^\Sigma(k).$$

4. A voltage source converter according to claim 3, wherein the modulation index demand established by the voltage source converter controller for each chain-link converter is given by $$\rho(k) = \frac{v^*(k)}{v^\Sigma(k - n/2)}$$

where,
    v*(k) is the chain-link converter voltage reference that the corresponding chain-link converter (24) is required to produce;
    $v^\Sigma(k-n/2)$ is the total voltage sum received from the at least one chain-link converter controller, with n being representative of a symmetrical round trip delay between each chain-link converter controller and the voltage source converter controller.

5. A voltage source converter according to claim 4, wherein the modulation index demand received by each corresponding chain-link converter controller, is considered to be given by $$\rho(k) = \frac{v^*(k)}{v^\Sigma(k - n)}.$$

6. A voltage source converter according to claim 5, wherein the chain-link converter voltage reference each chain-link converter controller reconstructs is given by $$v(k) = \left(\frac{v^*(k)}{v^\Sigma(k - n)}\right) v^\Sigma(k - n) = v^*(k)$$

where,
    $v^\Sigma(k-n)$ is the total voltage sum established at the first time instant.

7. A voltage source converter according to claim 4, wherein n representative of the symmetrical round-trip delay is established by time-stamping the total voltage sum established at the first time instant.

8. A voltage source converter according to claim 4, wherein n representative of the symmetrical round-trip delay is recalculated each time a total voltage sum is established at a subsequent time instant.

9. A voltage source converter according to claim 2, wherein the at least one chain-link converter controller is further programmed to apply a sequence identifier to the established total voltage sum prior to sending the established total voltage sum to the voltage source converter controller, and the voltage source converter controller synchronizes the established modulation index demand with the received total voltage sum by applying a corresponding sequence identifier to the established modulation index demand prior to sending the established modulation index demand to each corresponding chain-link converter controller.

10. A voltage source converter according to claim 9, wherein each chain-link converter controller is further programmed to reconstruct the chain-link converter voltage reference the chain-link converter it is controlling is required to produce by multiplying the received modulation index demand by the total voltage sum having the corresponding sequence identifier.

11. A method of operating a voltage source converter to convert power between AC and DC in a HVDC power transmission network, the voltage source converter comprising:

first and second DC terminals for connection to a DC network and having at least one converter limb extending therebetween, the or each converter limb including first and second limb portions separated by a corresponding AC terminal for connection to a respective phase of an AC network, each limb portion including a chain-link converter extending between the associated AC terminal and a corresponding one of the first or the second DC terminal and each chain-link converter including a chain-link converter controller programmed to control a plurality of series connected chain-link modules each having a plurality of switching elements connected in parallel with an energy storage device, whereby each chain-link converter is controllable to provide a stepped variable voltage source; and a voltage source converter controller arranged in operative communication with each chain-link converter controller to coordinate operation of the chain-link converters;

the method comprising the steps of:
(a) having at least one chain-link converter controller establish at a first time instant a total voltage sum of all energies stored by the energy storage devices in each chain-link converter within the voltage source converter, and having the at least one chain-link converter controller send the established total voltage sum to the voltage source converter controller;
(b) having the voltage source converter controller establish a modulation index demand for each chain-link converter, each modulation index demand corresponding to a chain-link converter voltage reference that the corresponding chain-link converter is required to produce divided by the received total voltage sum, and further having the voltage source converter controller send the established modulation index demand to each corresponding chain-link converter controller; and
(c) having each chain-link converter controller reconstruct from the received modulation index demand, the chain-link converter voltage reference that the chain-link converter it is controlling and is required to produce, wherein the chain-link converter voltage reference is reconstructed by multiplying the received modulation index demand by the total voltage sum established at the first time instant.

\* \* \* \* \*